(12) United States Patent
Nagata et al.

(10) Patent No.: US 10,456,911 B2
(45) Date of Patent: Oct. 29, 2019

(54) CONVEYANCE METHOD AND CONVEYANCE DEVICE

(71) Applicant: FUJI CORPORATION, Chiryu-shi (JP)

(72) Inventors: Ryo Nagata, Okazaki (JP); Masatoshi Fujita, Anjyo (JP)

(73) Assignee: FUJI CORPORATION, Chiryu-shi (JP)

( * ) Notice: Subject to any disclaimer, the term of this patent is extended or adjusted under 35 U.S.C. 154(b) by 148 days.

(21) Appl. No.: 15/517,292

(22) PCT Filed: Oct. 10, 2014

(86) PCT No.: PCT/JP2014/077165
§ 371 (c)(1),
(2) Date: Apr. 6, 2017

(87) PCT Pub. No.: WO2016/056117
PCT Pub. Date: Apr. 14, 2016

(65) Prior Publication Data
US 2017/0305012 A1 Oct. 26, 2017

(51) Int. Cl.
*B25J 9/16* (2006.01)
*B25J 13/08* (2006.01)
(Continued)

(52) U.S. Cl.
CPC ........... *B25J 9/1641* (2013.01); *B25J 9/1697* (2013.01); *B25J 13/088* (2013.01);
(Continued)

(58) Field of Classification Search
CPC ...... B25J 9/1641; B25J 9/1697; B25J 13/088; B25J 15/0616; G05B 2219/39195;
(Continued)

(56) References Cited

U.S. PATENT DOCUMENTS 6,615,110 B2 * 9/2003 Matsuo ................. B25J 9/1641
318/560
2015/0151432 A1 * 6/2015 Gomi ..................... B25J 9/1641
700/258

(Continued)

FOREIGN PATENT DOCUMENTS

EP 1063072 A1 12/2000
JP 6-166489 A 6/1994
(Continued)

OTHER PUBLICATIONS

International Search Report dated Dec. 22, 2014, in PCT/JP2014/077165, filed Oct. 10, 2014.
(Continued)

*Primary Examiner* — Robert T Nguyen
(74) *Attorney, Agent, or Firm* — Oblon, McClelland, Maier & Neustadt, L.L.P.

(57) ABSTRACT

After a component picked up by a suction nozzle is moved in an XY direction towards target XY coordinates, a waveform of a vibration (vibration waveform) in the Y direction arising in the component after the component has arrived near the target XY coordinates is measured, and control is performed such that the component arrives at a target Z coordinate (value zero) when a displacement y of the component crosses a node of the measured vibration waveform.

10 Claims, 5 Drawing Sheets

(51) Int. Cl.
*B25J 15/06* (2006.01)
*G05D 19/02* (2006.01)

(52) U.S. Cl.
CPC . *B25J 15/0616* (2013.01); *G05B 2219/39195* (2013.01); *G05B 2219/39241* (2013.01); *G05B 2219/42077* (2013.01); *G05B 2219/45063* (2013.01); *G05D 19/02* (2013.01)

(58) Field of Classification Search
CPC ........... G05B 2219/39241; G05B 2219/42077; G05B 2219/45063; G05D 19/02
See application file for complete search history.

(56) References Cited

U.S. PATENT DOCUMENTS

| | | | | |
|---|---|---|---|---|
| 2017/0120444 | A1* | 5/2017 | Motoyoshi | B25J 9/1641 |
| 2017/0355078 | A1* | 12/2017 | Ur | B25J 9/1612 |

FOREIGN PATENT DOCUMENTS

| | | |
|---|---|---|
| JP | 2001-1378 A | 1/2001 |
| JP | 2001-92511 A | 4/2001 |
| JP | 2012-196749 A | 10/2012 |
| JP | 2014-14894 A | 1/2014 |
| JP | 2014-52763 A | 3/2014 |

OTHER PUBLICATIONS

Office Action dated Jun. 27, 2018 in corresponding Japanese Patent Application No. 2016-552781 (with English Translation), 8 pages.
Extended European Search Report dated Jul. 6, 2018 in corresponding European Patent Application No. 14903589.1, 12 pages.
Hidemasa Goya et al., "Realization of High-Energy Efficient Pick-and-Place Tasks of SCARA Robots by Resonance", 2012 IEEE/RSJ International Conference on Intelligent Robots and Systems, XP032287930, Oct. 7-12, 2012, pp. 2730-2735.
Chang Tai Kiang et al., "Review of Control and Sensor System of Flexible Manipulator", Journal of Intelligent and Robotic Systems, vol. 77, No. 1, XP035410666, pp. 187-213.
Wisnu Aribowo et al., "Vibration Control of Semiconductor Wafer Transfer Robot by Building an Integrated Tool of Parameter Identification and Input Shaping", Proceedings of the 18th World Congress The International Federation of Automatic Control, XP055486159, Aug. 28-Sep. 2, 2011, pp. 14367-14373.

* cited by examiner

CONVEYANCE METHOD AND CONVEYANCE DEVICE

TECHNICAL FIELD

The present application relates to a conveyance method and a conveyance device using a robot an end section of which is movable in a first direction and a second direction, that loads a target object held by the end section by conveying the target object to a specified target position.

BACKGROUND ART

Conveyance devices that convey work are well-known. For example, disclosed in patent literature 1 is an item that, in a conveyance system provided with a conveyance device that conveys a work and a work robot that performs work on the work during conveyance, eliminates the influence of vibration between the robot and the work by predicting a vibration pattern that arises in the work during conveyance and recreating the vibration that arises in the work in the work robot based on the predicted vibration pattern.

CITATION LIST

Patent Literature

Patent Literature 1: JP-A-2014-14894

SUMMARY

A system that performs work on a work during conveyance of the work in this manner is able to eliminate the influence of vibration that arises in the work (target object), but because the work itself continues to experience vibration, it is not appropriate in a case in which the work is being loaded to a target position.

An object of the present disclosure is to improve the loading accuracy of a target object for an item that conveys and loads a target object held by an end section of a robot to a specified target position.

The present disclosure using the following device to achieve the above object.

The present disclosure of a conveyance method includes:
conveying and loading a target object held by an end section of a robot to a specified target position, the end section of the robot being able to move in a first direction and a second direction;
acquiring a first target position that is a target position in the first direction, and a second target position that is a target position in the second direction, as the specified target positions;
performing first direction movement control on the robot such that the position of the robot in the first direction matches the first target position; measuring or predicting a vibration waveform of the end section in the first direction after performing first direction movement control; and
performing second direction movement control to load the target object by controlling the robot such that the position of the end section in the second direction matches the second target position at a specified timing during vibration, based on the measured or predicted vibration waveform of the end section in the first direction.

With a conveyance method of the present disclosure, first direction movement control is performed such that the position in the first direction of the end section holding the target object matches the first target position, the vibration waveform of the end section in the first direction is measured after first direction movement control has been performed, and second direction movement control to load the target object by controlling the robot such that the position of the end section in the second direction matches the second target position at a specified timing during vibration is performed based on the vibration waveform. According, the loading accuracy of the target object is improved.

With a conveyance method of the present disclosure as given above, the second direction movement control may be performed to control the robot such that the position of the end section in the second direction matches the second target position when a displacement of the end section in the first direction becomes a node of the vibration waveform as the specified timing during vibration. Accordingly, a vibrating target object can be loaded to the target position with good accuracy.

Further, with a conveyance method of the present disclosure, as a method for measuring or predicting the vibration waveform of the end section in the first direction, the end section may be provided with an imaging device, and the vibration waveform of the end section in the first direction measured based on multiple images obtained by the imaging device performing imaging multiple times after the performing of the first direction movement control; or the end section may be provided with an acceleration sensor, and the vibration waveform of the end section in the first direction measured based on an acceleration detected by the acceleration sensor; or the vibration waveform of the end section in the first direction may be predicted based on a control instruction signal used when the robot is controlled by the first direction movement control.

Further, with a conveyance method of the present disclosure, the vibration waveform of the end section in the first direction after the first direction movement control has been performed may be predicted or learned, the first direction movement control may control the robot such that the position of the end section in the first direction matches a position deviated from the first target position by the amplitude of the vibration waveform that was predicted or learned, and the second direction movement control may control the robot such that the position of the end section in the second direction matches the second target position when the displacement of the end section in the first direction becomes an antinode of the vibration waveform as the specified timing during vibration. Accordingly, a vibrating target object can be loaded to the target position with good accuracy.

A conveyance device of the present disclosure is a conveyance device that performs specified work at a specified target position, and includes: a robot provided with an end section able to hold the target object and move in a first direction and a second direction; a target position acquiring device configured to acquire a first target position that is a target position in the first direction, and a second target position that is a target position in the second direction as the specified target positions; a first direction movement control device configured to perform first direction movement control on the robot such that the position of the robot in the first direction matches the first target position; a vibration waveform acquiring device configured to acquire a vibration waveform of the end section in the first direction after the first direction movement control has been performed; and a second direction movement control device configured to perform second direction movement control on the robot such that the position of the end section in the second direction matches the second target position at a specified timing during vibration, based on the acquired vibration waveform of the end section in the first direction.

According to a conveyance device of the present disclosure, it is possible to achieve the same effect as the above conveyance method, that is, the effect of improving the loading accuracy of a target object.

DESCRIPTION OF EMBODIMENTS

Next, a form for performing the present disclosure will be described using an example embodiment.

Figure 1:
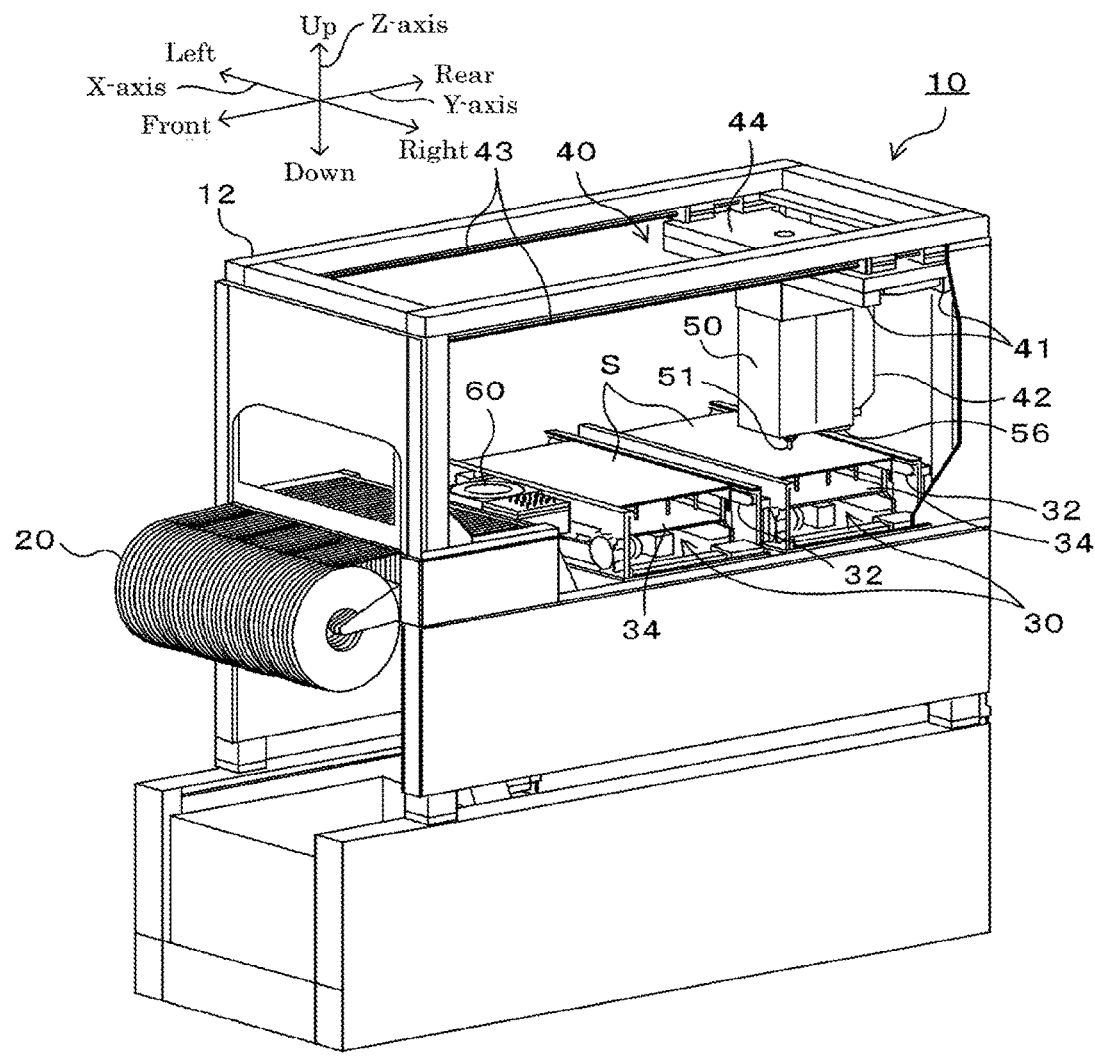
FIG. 1 is a configuration diagram showing an outline of the configuration of component mounter 10, which is an embodiment of the present disclosure.
Figure 2:
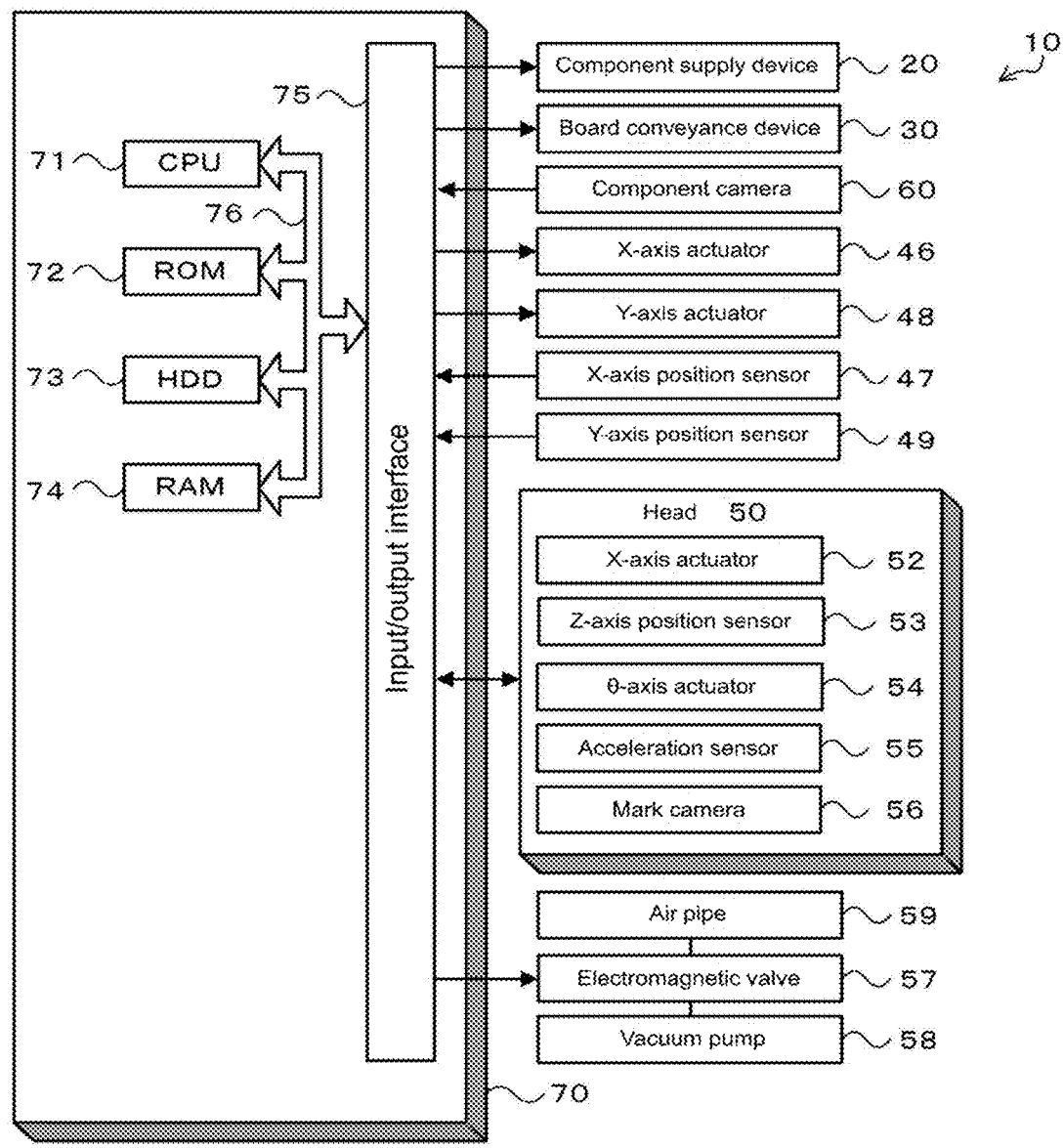
FIG. 2 is a block diagram showing the electrical connections of control device 70.

FIG. 1 is a configuration diagram showing an outline of the configuration of component mounter 10, which is an embodiment of the present disclosure; FIG. 2 shows the electrical connections of control device 70 of component mounter 10. Note that, in FIG. 1 the left-right direction is the X-axis direction, the front-rear direction is the Y-axis direction, and the up-down direction is Z-axis direction.

Component mounter 10 picks up component P, conveys component P to board S, and mounts component P at a target position on board S. As shown in FIG. 1, component mounter 10 is provided with board conveyance device 30 configured to convey board S, component supply device 20 configured to supply components P, head 50 that picks up component P supplied from component supply device 20 using suction nozzle 51 and mounts component P on board S conveyed by board conveyance device 30, XY robot 40 that moves head 50 in the XY direction, and control device 70 that controls the mounting machine overall (refer to FIG. 2). Further, component mounter 10, in addition to the above, is equipped with mark camera 56 provided on head 50 for imaging board positioning reference marks provided on board S, acceleration sensor 55 (refer to FIG. 2) provided near suction nozzle 51 of head 50 that detects acceleration a in the Y direction, component camera 60 for imaging the holding orientation of component P picked up by suction nozzle 51, and the like.

Component supply device 20, for example, may use a tape feeder that supplies component by feeding carrier tape.

As shown in FIG. 1, board conveyance device 30 is provided with belt conveyor device 32, and board S is conveyed from the left to the right in FIG. 1 (board conveyance direction) by the driving of belt conveyor device 32. Backup plate 34 for supporting conveyed board S from beneath is provided in a central portion of board conveyance device 30 in the board conveyance direction (X-axis direction).

As shown in FIG. 2, head 50 is provided with Z-axis actuator 52 that moves suction nozzle 51 in the up-down direction (Z direction) and θ-axis actuator 54 that rotates suction nozzle 51 around the Z-axis. The suction opening of suction nozzle 51 selectively connects to vacuum pump 58 or air pipe 59 via electromagnetic valve 57. Control device 70 is able to pick up component P using negative pressure at the suction opening of suction nozzle 51 by connecting the suction opening of suction nozzle 51 to vacuum pump 58 and then operating electromagnetic valve 57, and is able to release component P using positive pressure at the suction opening of suction nozzle 51 by connecting the suction opening of suction nozzle 51 to air pipe 59 and then operating electromagnetic valve 57.

As shown in FIG. 1, XY robot 40 is provided with Y-axis guide rail 43 attached to an upper level of main body frame 12 extending in the front-rear direction (Y direction), Y-axis slider 44 that is able to slide along Y-axis guide rail 43 while being supported on Y-axis guide rail 43, X-axis guide rail 41 attached to the lower surface of Y-axis slider 44 extending in the left-right direction (X direction), and X-axis slider 42 that is able to slide along X-axis guide rail 41. Head 50 is attached to X-axis slider 42, and control device 70 is able to move head 50 to any position in an XY plane by controlling XY robot 40.

Mark camera 56 images board positioning reference marks provided on board S, and outputs a captured image to control device 70. Control device 70 to which the image is inputted recognizes the backup position of board S based on the image.

Figure 4:
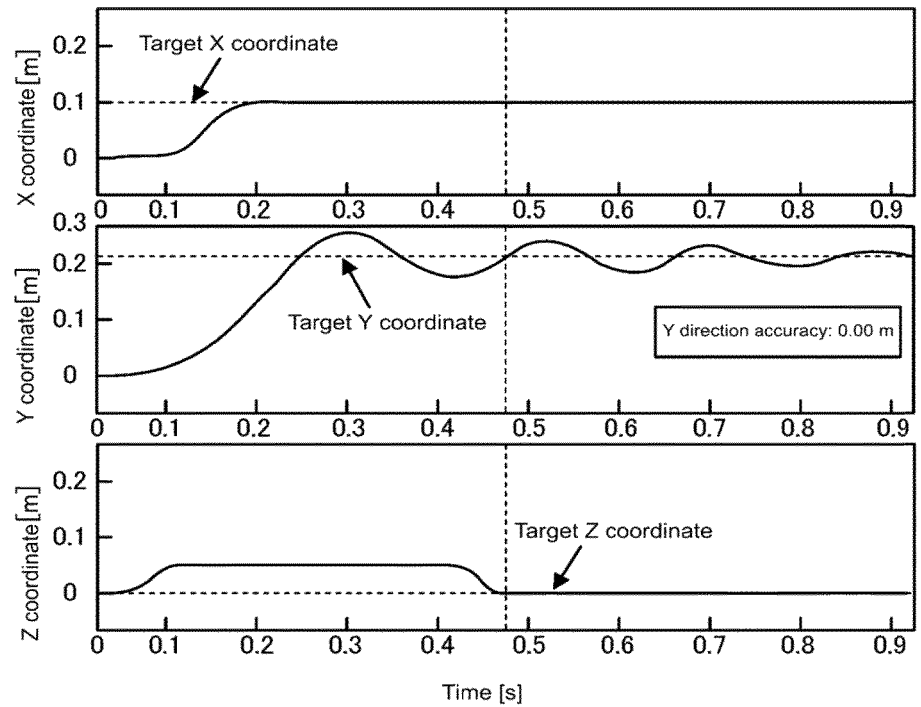
FIG. 4 illustrates the waveforms of end coordinates over time for the embodiment when XY robot 40 is operated.

As shown in FIG. 4, control device 70 is configured from CPU 71 that is based around a microprocessor, and is also provided with ROM 72, HDD 73, RAM 74, and input/output interface 75. These items are electrically connected by bus 76. A position signal from X-axis position sensor 47 that detects the position (position in X direction) of X-axis slider 42, a position signal from Y-axis position sensor 49 that detects the position (position in Y direction) of Y-axis slider 44, a position signal from Z-axis position sensor 53 that detects the position (position in Z direction) of suction nozzle 51, an image signal from mark camera 56, acceleration a in the Y direction from acceleration sensor attached to head 50, an image signal from component camera 60, and so on, are inputted to control device 70 via input/output interface 75. Also, a control signal to component supply device 20, a control signal to board conveyance device 30, a drive signal to X-axis actuator 46 that moves X-axis slider 42, a drive signal to Y-axis actuator 48 that moves Y-axis slider 44, a drive signal Z-axis actuator 52, a drive signal to θ-axis actuator 54, a drive signal to electromagnetic valve 57, and so on, are inputted to control device 70 via input/output interface 75.

Figure 3:
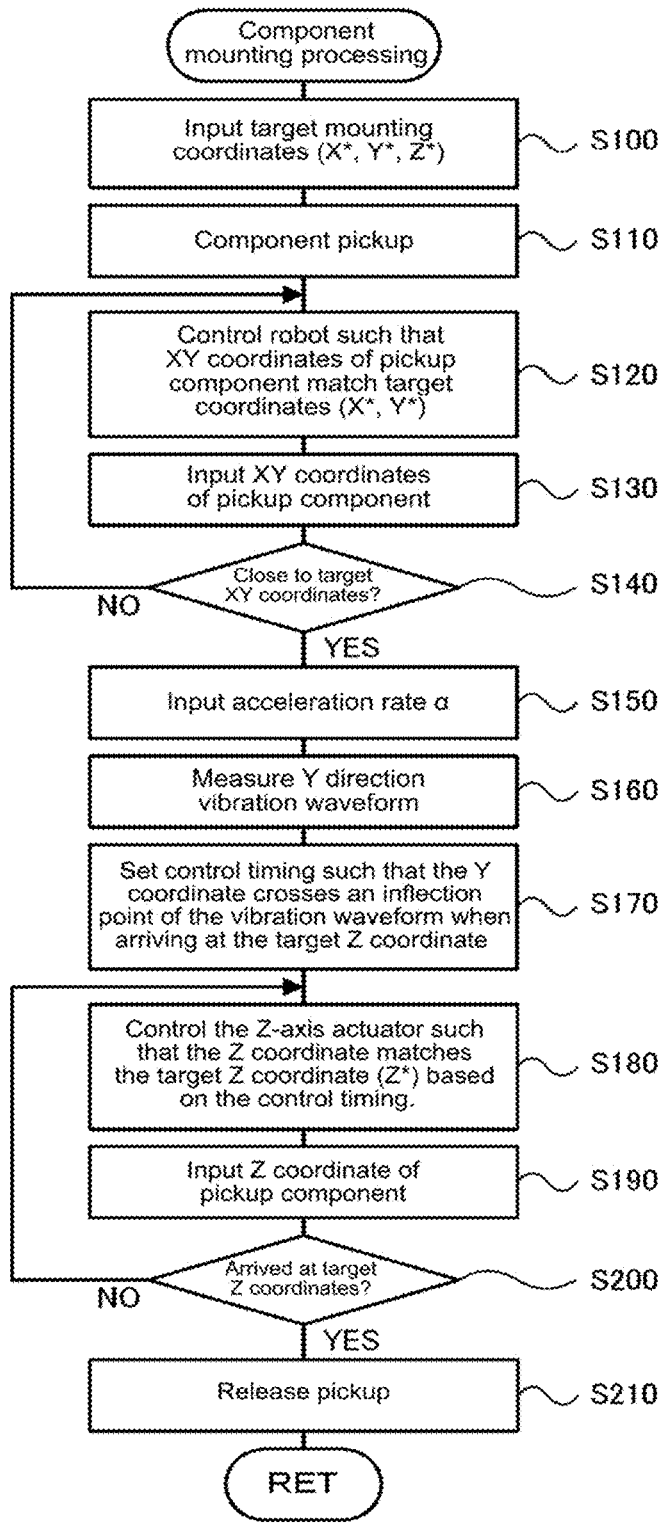
FIG. 3 is a flowchart showing an example of component mounting processing performed by CPU 71 of control device 70.

Operation of component mounter 10 of the embodiment configured as above is described next. FIG. 3 is a flowchart showing an example of component mounting processing performed by CPU 71 of control device 70. This processing is performed when an operator gives an instruction to perform mounting (production) of components P on board S.

When component mounting processing is performed, first CPU 71 of control device 70 inputs the target mounting position (X*, Y*, Z*) of board S (S100). Continuing, CPU 71 performs pickup operation of causing suction nozzle 51 to pick up component P supplied from component supply device 20 (S110). Here, pickup operation specifically device, after controlling XY robot 40 such that suction nozzle 51 attached to head 50 comes directly above component P, controlling Z-axis actuator 52 such that the suction opening of suction nozzle 51 contacts component P, and controlling electromagnetic valve 57 to supply negative pressure to the suction opening of suction nozzle 51. Then, CPU 71 controls XY robot 40 such that the component P picked up by suction nozzle 51 matches the target mounting position (X*, Y*) in the XY plane (S120), and inputs the current position in the XY plane (current XY coordinates) of the component P detected by X-axis position sensor 47 and Y-axis position sensor 49 (S130).

Next, CPU 71 determines whether the inputted current position of component P is near the target mounting position in the XY plane (X*, Y*) (S140), and if it is determined that the current position is near the target mounting position (X*, Y*), enters acceleration a in the Y direction of suction nozzle 51 (component P) from acceleration sensor 55 (S150), and measures the vibration waveform in the Y direction of component P based on the inputted acceleration a in the Y direction and the Y coordinate (displacement y in the Y direction) of the current position of component P inputted in S130. In the present embodiment, when component P is moved in the XY direction and mounted on board S, because the movement distance in the X direction is much shorter than the movement distance in the Y direction, with regard to the vibration arising in component P when it arrives near the target mounting position in the XY direction, the X component is immediately resolved, and only the Y component remains. Processing of S160 is for measuring the vibration waveform of the Y component that remains after arrival at the target mounting position. Here, in a case in which vibration arising in component P is taken as a sine wave, when "A" is the amplitude, "ω" is the angular frequency, and "t" is time, the following equations (1) and (2) hold true. Because angular frequency ω can be replaced by cycle T, phase ωt and cycle T of the vibration waveform can be obtained based on displacement y and acceleration α.

$$y = A \sin \omega t \quad \text{(Equation 1)}$$

$$\alpha = -\omega^2 A \sin \omega t \quad \text{(Equation 2)}$$

Further, CPU 71, sets (S170) control timing in the Z direction such that displacement y of component P in the Y direction crosses a node of the vibration waveform of the Y component measured in S160 when the time required for component P to be moved in the Z direction from the current position and mounted on board S will have elapsed, and controls (S180) Z-axis actuator 52 such that component P is moved in the Z direction and mounted on board S according to the set control timing. Here, the required time, for example, is obtained by performing experiments in advance of the elapsed time of moving component P in the Z direction to mounting component P on board S. Further, the current position in the Z direction of component P (Z coordinate) is inputted from Z-axis position sensor 53 (S190), and it is determined whether component P has reached the target Z coordinate (Z*=0) (S200). If CPU 71 determines that component P has not reached the target Z coordinate, CPU 71 returns processing to S180 and continues control of Z-axis actuator 52; if CPU 71 determines that component P has reached the target Z coordinate, CPU 71 controls electromagnetic valve 57 to release holding of component P by suction nozzle 51 (S210), and ends component mounting processing.

Figure 5:
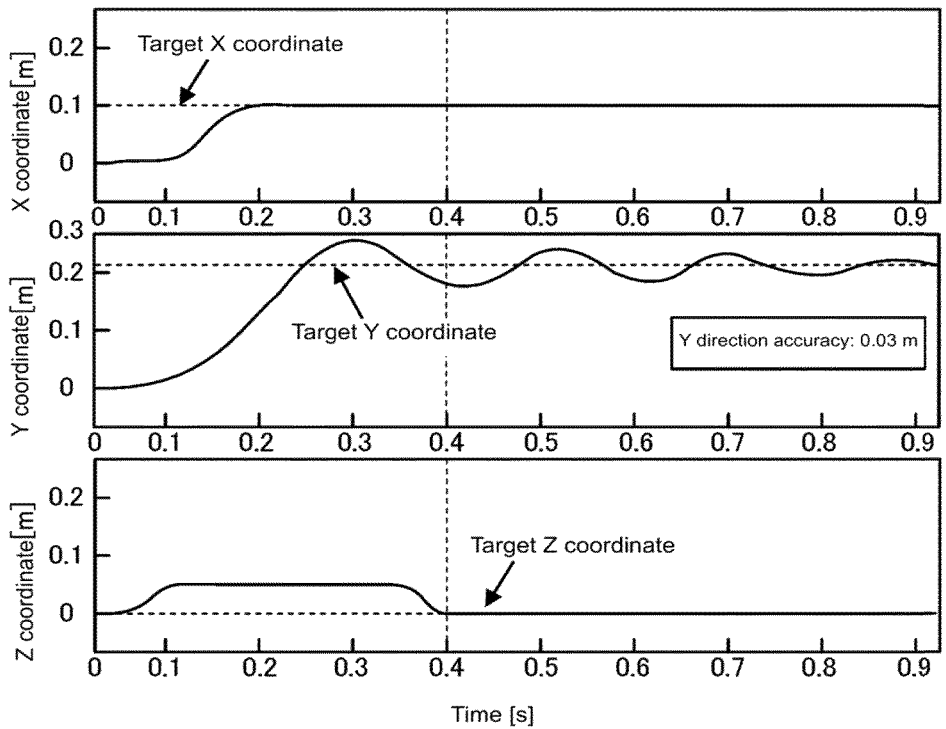
FIG. 5 illustrates the waveforms of end coordinates over time for an alternative example when XY robot 40 is operated.

FIGS. 4 and 5 illustrate the waveforms of robot end coordinates over time as XY robot 40 is operated. FIG. 4 shows the waveform over time for the embodiment, and FIG. 5 shows the waveform over time of a comparative example. As shown in the figures, when component P picked up by suction nozzle 51 is moved towards the target X coordinate and the target Y coordinate, residual vibration in the Y direction arises in component P. In the present embodiment, as shown in FIG. 4, the vibration waveform in the Y direction is measured, and control of movement in the Z direction is performed such that component P arrives at the target Z coordinate (value zero) as displacement y of component P in the Y direction crosses a node of the vibration waveform. Accordingly, it is possible to accurately mount component P at the XY coordinates even while vibration remains in the Y direction. Conversely, in the comparison example, as shown in FIG. 5, component P is mounted on board S at the earliest possible timing without measuring the vibration waveform. Thus, if vibration in the Y direction remains in component P, component P is mounted at a position deviated from the target Y coordinate.

Component mounting processing 10 of the present embodiment described above, after moving component P picked up by suction nozzle 51 towards the target XY coordinates, measures the waveform of the vibration (vibration waveform) arising in component P, and controls Z-axis actuator 52 such that component P arrives at the target Z coordinate (value zero) when displacement y of component P crosses a node of the measured vibration waveform. By this, even when lowering component P and mounting component P on board S while vibration remains after moving component P in the XY direction, it is possible to decrease the mounting position deviation. As a result, compared to a case in which component P is mounted on board S without measuring the vibration waveform of the robot end (component P), or a case in which component P is mounted after waiting for the vibration of the robot end (component P) to dissipate, the mounting position accuracy of component P is improved while shortening the time required for mounting.

With component mounting processing 10 of the present embodiment, control is performed such that component P arrives at the target Z coordinate (value zero) when displacement y of the robot end (component P) crosses a node of the measured vibration waveform, embodiments are not restricted to this, and may also be configured as follows. Amplitude A of vibration arising in the robot end (component P) when the robot end (component P) arrives near the target XY coordinates may be experimentally obtained in advance, and the target Y coordinate may be set as a corrected target Y coordinate that is shifted by amplitude A, and CPU 71 may control XY robot 40 such that component P moves to the target X coordinate and the corrected target Y coordinate when receiving an instruction to move and mount component P. Further, CPU 71 may measure the vibration waveform in the Y direction of the robot end (component P), and set control timing in the Z direction such that displacement y of component P in the Y direction passes through an antinode of the vibration waveform of the Y component that was measured when the time required for component P to be moved in the Z direction from the current position and mounted on board S will have elapsed, and may control Z-axis actuator 52 such that component P is moved in the Z direction and mounted on board S according to the set control timing. By this, even when moving component P in the Z direction and mounting component P on board S while vibration remains, it is possible to decrease the mounting position deviation, thus achieving a similar effect to that achieved by the first embodiment.

With component mounter 10 of the embodiment, in a case in which the movement distance is longer in the Y direction than in the X direction when component P is moved to the target XY coordinates, only the Y component of the vibration arising in the robot end (component P) after component P has arrived near the target XY coordinates is considered, but embodiments are not limited to this, and in a case in which the movement distance is longer in the X direction than in the Y direction when component P is moved to the target XY coordinates, only the X component of the vibration arising in the robot end (component P) after component P has arrived near the target XY coordinates may be considered, or both the X and the Y component of the vibration arising in the robot end (component P) after component P has arrived near the target XY coordinates may be considered. In the latter case, the vibration waveform of the X component and the vibration waveform of the Y component when component P arrives near the target XY coordinates may be measured, and control may be performed such that component P arrives at the target Z coordinate when the total of the deviation in the X direction and the deviation in the Y direction of the robot end (component P) is minimized. Further, the vibration waveform and the X component and the vibration waveform of the Y component when component P arrives near the target XY coordinates may be measured, then waiting for settling of the robot end (component P) in one of the X direction or the Y direction may be performed, and control performed such that component P arrives at the target Z coordinate at timing based on the other vibration waveform.

With component mounter 10 of the present embodiment, the residual vibration waveform when component P is moved in the XY direction is measured based on displacement y and acceleration a, but embodiments are not limited to this; vibration waveforms may be measured based on image data obtained by imaging consecutively using a camera (for example, mark camera 56) attached to the robot end (head 50), or vibration waveforms may be predicted by estimating acceleration a using control signals output to X-axis actuator 46 and Y-axis actuator 48 when controlling XY robot 40.

Figure 6:
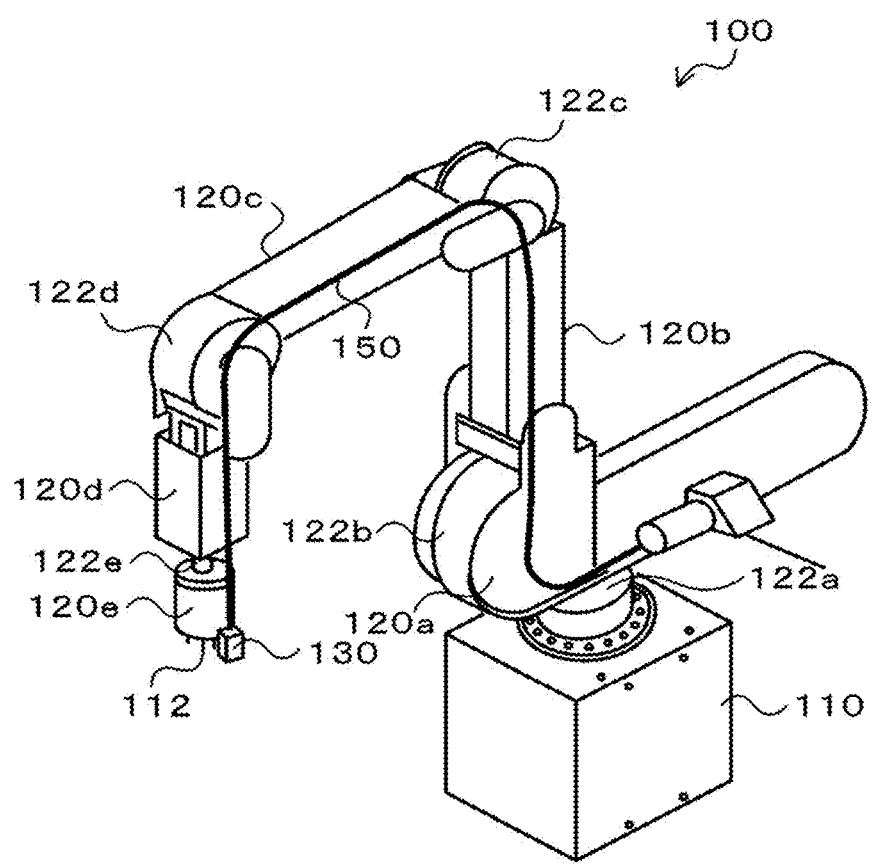
FIG. 6 is a configuration diagram showing an outline of the configuration of component mounter 100, which is an alternative embodiment.

With component mounter 10 of the present embodiment, component P is moved using a horizontal cartesian robot, but embodiments are not limited to this and various robot types are applicable, for example, a vertical cartesian robot, a cylindrical coordinate robot, or a vertical articulated robot. An example of a vertical articulated robot device is shown in FIG. 6. Component mounter 100 of FIG. 6 is a vertical articulated robot provided with base 110 that is set on the floor, first to fifth links 120a to 120e, first to fifth joints 122a to 122e forming an articulated arm connected in series to base 110 and first to fifth links 120a to 120e, and drive motors that are not shown and that drive each of first to fifth joints 122a to 122e. In the example of FIG. 6, first joint 122a and fifth joint 122e are rotation joints, and second to fourth joints 122b to 122d are swing joints. In this case, the flowchart in FIG. 3 may be performed by replacing the XYZ directions of the first embodiment with rotation directions or swing directions of first to fifth joints 122a to 122e. Because for this type of articulated robot, the vibration of the arm end section when the arm is moved is large, the disclosure is particularly effective.

With the first embodiment, the present disclosure was described applied to component mounter 10 that moves and mounts component P on board S using a robot (XY robot 40 and head 50), but embodiments are not limited to this and may be applied to an adhesive application device that uses a robot to move adhesive to a target position and apply the adhesive, or a solder application device that uses a robot to move solder to a target position and apply the solder. In this case, the flowchart in FIG. 3 may be performed by replacing component P with adhesive or solder respectively.

Correspondences between main constituent elements of the embodiments and main constituent elements of the disclosure will be clarified here. XY robot 40 and head 50 correspond to "robot", the X direction or Y direction corresponds to "first direction", and the Z direction corresponds to "second direction". Further, mark camera 56 corresponds to "imaging device". Also, acceleration sensor 55 corresponds to "acceleration sensor". CPU 71 of control device 70 that performs processing of S100 of the component mounting processing shown in FIG. 3 corresponds to the "target position acquiring device", CPU 71 of control device 70 that performs the processing of S120 to S140 corresponds to the "first direction movement control device", CPU 71 of control device 70 that performs the processing of S150 and S160 corresponds to the "vibration waveform acquiring device", and CPU 71 of control device 70 that performs the processing of S170 to S210 corresponds to the "second direction movement control device".

Meanwhile, it goes without saying that the disclosure is not limited to the above-mentioned embodiment and various embodiments may be applied within the technical scope of the disclosure.

INDUSTRIAL APPLICABILITY

The present disclosure may be applied to the industrial field of component mounters and the like.

REFERENCE SIGNS LIST

10: component mounting device; 12: main body frame; 20: component supply device; 30: board conveyance device; 32: belt conveyor device; 34: backup plate; 40: XY robot; 41: X-axis guide rail; 42: X-axis slider; 43: Y-axis guide rail; 44: Y-axis slider; 46: X-axis actuator; 47: X-axis position sensor; 48: Y-axis actuator; 49: Y-axis position sensor; 50: head; 51: suction nozzle; 52: Z-axis actuator; 54: θ-axis actuator; 55: acceleration sensor; 56: mark camera; 57: electromagnetic valve; 58: vacuum pump; 59: air pipe; 60: component camera; 70: control device; 71: CPU; 72: ROM; 73: HDD; 74: RAM; 75: input/output interface; 76: bus; 100: component mounting device; 110: base; 120a to 120e: first to fifth links; 122a to 122e: first to fifth joints; S: board; P: component.

The invention claimed is:

1. A conveyance method comprising:
    conveying and loading a target object held by an end section of a robot to a specified target position, the end section of the robot being able to move in a first direction and a second direction;
    acquiring a first target position that is a target position in the first direction, and a second target position that is a target position in the second direction, as the specified target positions;
    performing first direction movement control on the robot such that a position of the robot in the first direction matches the first target position;
    measuring or predicting a vibration waveform of the end section in the first direction after performing first direction movement control; and
    performing second direction movement control to load the target object by controlling the robot such that a position of the end section in the second direction matches the second target position at a specified timing during vibration, based on the measured or predicted vibration waveform of the end section in the first direction.

2. The conveyance method according to claim 1, wherein the second direction movement control is performed to control the robot such that the position of the end section in the second direction matches the second target position when a displacement of the end section in the first direction crosses a node of the vibration waveform as the specified timing during vibration.

3. The conveyance method according to claim 1, wherein the end section is provided with a camera, and the vibration waveform of the end section in the first direction is measured based on multiple images obtained by the camera performing imaging multiple times after the performing of the first direction movement control.

4. The conveyance method according to claim 1, wherein the end section is provided with an acceleration sensor, and the vibration waveform of the end section in the first direction is measured based on an acceleration detected by the acceleration sensor.

5. The conveyance method according to claim 1, wherein the vibration waveform of the end section in the first direction is predicted based on a control instruction signal used when the robot is controlled by the first direction movement control.

6. The conveyance method according to claim 1, wherein the vibration waveform of the end section in the first direction after the first direction movement control has been performed is predicted or learned, the first direction movement control controls the robot such that the position of the end section in the first direction matches a position deviated from the first target position by an amplitude of the vibration waveform that was predicted or learned, and the second direction movement control controls the robot such that the position of the end section in the second direction matches the second target position when a displacement of the end section in the first direction passes through an antinode of the vibration waveform as the specified timing during vibration.

7. The conveyance method according to claim 2, wherein the end section is provided with a camera, and the vibration waveform of the end section in the first direction is measured based on multiple images obtained by the camera performing imaging multiple times after the performing of the first direction movement control.

8. The conveyance method according to claim 2, wherein the end section is provided with an acceleration sensor, and the vibration waveform of the end section in the first direction is measured based on an acceleration detected by the acceleration sensor.

9. The conveyance method according to claim 2, wherein the vibration waveform of the end section in the first direction is predicted based on a control instruction signal used when the robot is controlled by the first direction movement control.

10. A conveyance device for conveying and loading a target object to a specified target position, the conveyance device comprising:
a robot provided with an end section able to hold the target object and move in a first direction and a second direction; and
a processor configured to:
acquire a first target position that is a target position in the first direction, and a second target position that is a target position in the second direction as the specified target positions;
perform first direction movement control on the robot such that the position of the robot in a first direction matches the first target position;
acquire a vibration waveform of the end section in the first direction after the first direction movement control has been performed; and
load the target object by performing second direction movement control that controls the robot such that a position of the end section in the second direction matches the second target position at a specified timing during vibration, based on the acquired vibration waveform of the end section in the first direction.

* * * * *